United States Patent
Brewer et al.

(10) Patent No.: US 6,569,955 B1
(45) Date of Patent: May 27, 2003

(54) THERMOPLASTIC SILICONE ELASTOMERS FROM COMPATIBILIZED POLYAMIDE RESINS

(75) Inventors: Christopher Michael Brewer, Farwell, MI (US); Igor Chorvath, Midland, MI (US); Frances Marie Fournier, Flint, MI (US); Craig Steven Gross, Midland, MI (US); Michael Kang-Jen Lee, Midland, MI (US); Dawei Li, Midland, MI (US); Richard Leroy Rabe, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 48 days.

(21) Appl. No.: 10/043,907

(22) Filed: Oct. 19, 2001

(51) Int. Cl.[7] ............................................... C08G 77/08
(52) U.S. Cl. ..................... 525/431; 525/903; 524/862; 524/751; 524/754
(58) Field of Search ................. 525/431, 903; 524/862, 751, 754

(56) References Cited

U.S. PATENT DOCUMENTS

| 4,500,688 A | 2/1985 | Arkles .......................... 525/431 |
| 4,695,602 A | 9/1987 | Crosby et al. ............... 524/439 |
| 4,714,739 A | 12/1987 | Arkles .......................... 525/92 |
| 4,831,071 A | 5/1989 | Ward et al. .................. 524/401 |
| 6,013,715 A | 1/2000 | Gornowicz et al. .......... 524/492 |
| 6,281,286 B1 | 8/2001 | Chorvath et al. ............ 524/862 |
| 6,362,287 B1 | 3/2002 | Chorvath et al. ............ 525/431 |
| 6,362,288 B1 * | 3/2002 | Brewer et al. ............... 525/431 |
| 6,417,293 B1 | 7/2002 | Chorvath et al. ............ 525/446 |
| 6,465,552 B1 * | 10/2002 | Chorvath et al. ............ 524/323 |
| 6,479,580 B1 | 11/2002 | Chorvath et al. ............ 524/588 |

FOREIGN PATENT DOCUMENTS

| EP | 0651009 A1 | 5/1995 | ........... C08L/21/00 |
| WO | WO 96/01291 | 1/1996 | ........... C08L/21/00 |

* cited by examiner

Primary Examiner—Margaret G. Moore
(74) Attorney, Agent, or Firm—Alan Zombeck

(57) ABSTRACT

A method for preparing a thermoplastic elastomer is disclosed, said method comprising:

(I) mixing
  (A) a Theologically stable polyamide resin having a melting point or glass transition temperature of 25° C. to 275° C.,
  (B) a silicone base comprising a diorganopolysiloxane gum having a plasticity of at least 30 and having an average of at least 2 alkenyl groups in its molecule and optionally
    (B") 5 to 200 parts by weight of a reinforcing filler, the weight ratio of said silicone base to said polyamide resin is from 35:65 to 85:15,
  (C) a compatibilizer selected from glycidyl ester polymers or organofunctional grafted polyolefins,
  (D) an organohydrido silicon compound which contains an average of at least 2 silicon-bonded hydrogen groups in its molecule and
  (E) a hydrosilation catalyst, components (D) and (E) being present in an amount sufficient to cure said diorganopolysiloxane (B'); and (II) dynamically curing said diorganopolysiloxane (B').

30 Claims, No Drawings

THERMOPLASTIC SILICONE ELASTOMERS FROM COMPATIBILIZED POLYAMIDE RESINS

FIELD OF THE INVENTION

The present invention relates to a thermoplastic elastomer composition whe rein a silicone base is blended with a polyamide resin and a compatibilizer, selected from glycidyl ester polymers or organofunctional grafted polyolefins, and silicone gum contained in the base is dynamically vulcanized during the mixing process.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). In such a material, the elastomeric component can be cured by various mechanisms, but it has been shown that the use of a non-specific radical initiator, such as an organic peroxide, can also result in at least a partial cure of the thermoplastic resin itself, thereby reducing or completely destroying the ability to re-process the composition (i.e., it no longer is a thermoplastic). In other cases, the peroxide can lead to the partial degradation of the thermoplastic resin. To address these problems, elastomer-specific crosslinkers, such as organohydrido silicon compounds, can be used to cure alkenyl-functional silicone elastomers.

Arkles, in U.S. Pat. No. 4,500,688, discloses semi-interpenetrating networks (IPN) wherein a vinyl-containing silicone fluid having a viscosity of 500 to 100,000 cS is dispersed in a conventional thermoplastic resin. Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. This disclosure states that the chain extension procedure results in a thermoplastic composition when the vinyl-containing silicone has 2 to 4 vinyl groups and the hydride-containing silicone has 1 to 2 times the equivalent of the vinyl functionality. On the other hand, silicones which predominantly undergo crosslinking reaction result in thermoset compositions when the vinyl-containing silicone has 2 to 30 vinyl groups and the hydride-containing silicone has 2 to 10 times the equivalent of the vinyl functionality. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin.

Publication WO 96/01291 to Advanced Elastomer Systems discloses thermoplastic elastomers having improved resistance to oil and compression set. These systems are prepared by first forming a cured rubber concentrate wherein a curable elastomeric copolymer is dispersed in a polymeric carrier not miscible therewith, the curable copolymer being dynamically vulcanized while this combination is mixed. The resulting rubber concentrate is, in turn, blended with an engineering thermoplastic to provide the desired TPE. Silicone rubber is disclosed as a possible elastomeric component, but no examples utilizing such a silicone are provided. Further, this publication specifically teaches that the polymeric carrier must not react with the cure agent for the curable copolymer.

Crosby et al. in U.S. Pat. No. 4,695,602 teach composites wherein a silicone semi-IPN vulcanized via a hydrosilation reaction is dispersed in a fiber-reinforced thermoplastic resin having a high flexural modulus. The silicones employed are of the type taught by Arkles, cited supra, and the composites are said to exhibit improved shrinkage and warpage characteristics relative to systems which omit the IPN.

Ward et al., in U.S. Pat. No. 4,831,071, disclose a method for improving the melt integrity and strength of a high modulus thermoplastic resin to provide smooth-surfaced, high tolerance profiles when the modified resin is melt-drawn. As in the case of the disclosures to Arkies et al., cited supra, a silicone mixture is cured via a hydrosilation reaction after being dispersed in the resin to form a semi-IPN, and the resulting composition is subsequently extruded and melt-drawn.

European Patent Application 0651009A1 to Sumitomo Bakelite Co., published May 3, 1995, discloses a thermoplastic elastomer composition which is prepared by dynamically heating a mixture comprising an unsaturated organic (i.e., non-silicone) rubber, a thermoplastic resin, an SiH-containing crosslinker, a hydrosilating catalyst and a compatibilizing agent.

U.S. Pat. No. 6,013,715 to Gornowicz et al. teaches the preparation of TPSiV elastomers wherein a silicone gum (or filled silicone gum) is dispersed in either a polyolefin or a poly(butylene terephthalate) resins and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends). This is, of course, of great commercial significance since the vulcanization procedure, and the cure agents required therefor, add to both the complexity as well as the expense of the preparation and vulcanization would be avoided in many applications if essentially identical mechanical properties could be obtained without its employ.

U.S. Pat. No. 6,281,286 to Chorvath et.al. discloses that the impact resistance of polyester and polyamide resins can be greatly augmented by preparing a thermoplastic silicone vulcanizate therefrom wherein the elastomeric component is a silicone rubber base which comprises a silicone gum and a silica filler and the weight ratio of the base to the resin ranges from 10:90 to 35:65. Although the resulting thermoplastic materials have improved impact resistance, they do not exhibit sufficiently low modulus to be useful as elastomers.

Copending application Ser. No. 09/535,556, filed on Mar. 27, 2000, discloses the incorporation of a hindered phenol compound in a TPSiV based on specific nylons wherein the phenol compound imparts improved mechanical properties relative to an unmodified composition.

Copending U.S. patent application Ser. No. 09/728,920, filed on Dec. 4, 2000, discloses thermoplastic elastomer compositions wherein a silicone gum and a stabilizer are dispersed in a polyester resin and the silicone gum is dynamically vulcanized in the resulting mixture.

Copending U.S. patent applications Ser. No. 09/843,906 and Ser. No. 09/845,971 discloses methods for making TPSiV using peroxide cure techniques. Ser. No. 09/843,906 teaches polyolefin TPSiV's whereas Ser. No. 09/845,971 teaches polyamide and polyester based TPSiV's.

Copending U.S. patent application Ser. No. 09/616,625, filed on Jul. 26, 2000, discloses the incorporation of a compatibilizer selected from (i) a coupling agent, (ii) a functional diorganopolysiloxane or (iii) a copolymer comprising at least one diorganopolysiloxane block and at least one block selected from polyamide, polyether, polyurethane, polyurea, polycarbonate or polyacrylate, in a TPSiV elastomer based on specific nylons wherein that inclusion the selected compatibilizer in the formulation improves either tensile strength or elongation over a similar TPSiV elastomer which does not contain the compatibilizer.

While copending U.S. patent application Ser. No. 09/616,625 represents a significant advancement in the art, there is still a need to identify further materials that can function as compatibilizers for polyamide based TPSiV elastomers. In particular, there is a need to identify compatibilizers that can provide comparable formulations as taught in copending U.S. patent application Ser. No. 09/616,625, and yet have greater commercial utility for many market applications.

SUMMARY OF THE INVENTION

The present invention provides polyamide TPSiV elastomers by the incorporation of a compatibilizer, selected from glycidyl ester polymers or organofunctional grafted polyolefins, into the formulation. The elastomers disclosed herein generally have good appearance, have an elongation of at least 25% and have a tensile strength and/or elongation at least 25% greater than that of the corresponding simple (physical) blend wherein the diorganopolysiloxane is not cured.

The present invention, therefore, relates to a thermoplastic elastomer prepared by
(I) mixing
  (A) a rheologically stable polyamide resin having a melting point or glass transition temperature of 25° C. to 275° C.,
  (B) a silicone base comprising
    (B') 100 parts by weight of a diorganopolysiloxane gum having a plasticity of at least 30 and having an average of at least 2 alkenyl groups in its molecule and optionally, (B") 5 to 200 parts by weight of a reinforcing filler, the weight ratio of said silicone base to said polyamide resin is from 35:65 to 85:15,
  (C) a compatibilizer selected from glycidyl ester polymers or organofunctional grafted polyolefins,
  (D) an organohydrido silicon compound which contains an average of at least 2 silicon-bonded hydrogen groups in its molecule and
  (E) a hydrosilation catalyst, components (D) and (E) being present in an amount sufficient to cure said diorganopolysiloxane (B'); and
(II) dynamically vulcanizing said diorganopolysiloxane (B').

In preferred embodiments of the present invention, a stabilizer (F) is included in the formulation. Stabilizer (F) is at least one organic compound selected from hindered phenols; thioesters; hindered amines; 2,2'-(1,4-phenylene) bis(4H-3, 1-benzoxazin-4-one); or 3,5-di-tert-butyl-4-hydroxybenzoic acid, hexadecyl ester.

The invention further relates to a thermoplastic elastomer which is prepared by the above method.

DETAILED DESCRIPTION OF THE INVENTION

The first step of the method of the present invention involves mixing:
(A) a rheologically stable polyamide resin having a melting point or glass transition temperature of 25° C. to 275° C.,
(B) a silicone base comprising
  (B') 100 parts by weight of a diorganopolysiloxane gum having a plasticity of at least 30 and having an average of at least 2 alkenyl groups in its molecule and optionally,
  (B") 5 to 200 parts by weight of a reinforcing filler, the weight ratio of said silicone base to said polyamide resin is from 35:65 to 85:15,
(C) a compatibilizer selected from glycidyl ester polymers or organofunctional grafted polyolefins,
(D) an organohydrido silicon compound which contains an average of at least 2 silicon-bonded hydrogen groups in its molecule, and
(E) a hydrosilation catalyst, components (D) and (E) being present in an amount sufficient to cure said diorganopolysiloxane (B').

Component (A) of the present invention is a thermoplastic polyamide resin. These resins are well known by the generic term "nylon" and are long chain synthetic polymers containing amide (i.e., —C(O)—NH—) linkages along the main polymer chain. For the purposes of the present invention, the polyamide resin has a melt point (m.p.), or glass transition temperature ($T_g$) if the polyamide is amorphous, of room temperature (i.e., 25° C.) to 275° C. Attempts to prepare TPSiV elastomers from polyamides having higher melt points (e.g., nylon 4/6) resulted in poor physical properties, the ultimate elongation of such products being less than the required 25% according to the present invention. Furthermore, for the purposes of the present invention, the polyamide resin is preferably dried by passing a dry, inert gas over resin pellets or powder at elevated temperatures. The degree of drying consistent with acceptable properties and processing depends on the particular polyamide and its value is generally recommended by the manufacturer or may be determined by a few simple experiments. It is generally preferred that the polyamide resin contains no more than about 0.1 weight percent of moisture. Finally, the polyamide must also be Theologically stable under the mixing conditions required to prepare the TPSiV elastomer, as described infra. This stability is evaluated on the neat resin at the appropriate processing temperature and a change of more than 20% in melt viscosity (mixing torque) within the time generally required to prepare the corresponding TPSiVs (e.g., 10 to 30 minutes in a bowl mixer) indicates that the resin is outside the scope of the present invention. Thus, for example, a dried nylon 11 sample having a m.p. of 198° C. was mixed in a bowl mixer under a nitrogen gas purge at about 210 to 220° C. for about 15 minutes and the observed mixing torque increased by approximately 200%. Such a polyamide resin is not a suitable candidate for the instant method.

Other than the above mentioned limitations, resin (A) can be any thermoplastic crystalline or amorphous high molecular weight solid homopolymer, copolymer or terpolymer having recurring amide units within the polymer chain. In copolymer and terpolymer systems, more than 50 mole percent of the repeat units are amide-containing units. Examples of suitable polyamides are polylactams such as nylon 6, polyenantholactam (nylon 7), polycapryllactam (nylon 8), polylauryllactam (nylon 12), and the like; homopolymers of aminoacids such as polypyrrolidinone (nylon 4); copolyamides of dicarboxylic acid and diamine such as nylon 6/6, nylon 66, polyhexamethyleneazelamide (nylon 6/9), polyhexamethylene-sebacamide (nylon 6/10), polyhexamethyleneisophthalamide (nylon 6,I), polyhexamethylenedodecanoic acid (nylon 6/12) and the like; aromatic and partially aromatic polyamides; copolyamides such as copolymers of caprolactam and hexamethyleneadipamide (nylon 6,6/6), or a terpolyamide (e.g., nylon 6,6/6,6); block copolymers such as polyether polyamides; or mixtures thereof. Preferred polyamide resins are nylon 6, nylon 12, nylon 6/12 and nylon 6/6.

It is also contemplated that component (A) can be blended with a non-polyamide, saturated thermoplastic resin such that the polyamide resin (A) comprises more than 50 percent of the blend volume. Preferably, this optional resin should have a glass transition temperature of 25° C. to 275° C.

Silicone base (B) is a uniform blend of a diorganopolysiloxane gum (B') and a reinforcing filler (B").

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane gum (B') has a glass temperature (or melt point) which is below room temperature and the gum is therefore elastomeric. Methyl preferably makes up at least 50, more preferably at least 90, mole percent of the non-unsaturated silicon-bonded organic groups in component (B').

Thus, polydiorganosiloxane (B') can be a homopolymer or a copolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B') include:
trimethylsiloxy-endblocked dimethylsiloxane-methylhexenylsiloxane copolymers;
dimethylhexenlylsiloxy-endblocked dimethylsiloxane-methylhexenylsiloxane copolymers;
trimethylsiloxy-endblocked dimethylsiloxane-methylvinylsiloxane copolymers;
trimethylsiloxy-endblocked methylphenylsiloxane-dimethylsiloxane-methylvinylsiloxane copolymers; dimethylvinylsiloxy-endblocked dimethylpolysiloxanes;
dimethylvinylsiloxy-endblocked dimethylsiloxane-methylvinylsiloxane copolymers;
dimethylvinylsiloxy-endblocked methylphenylpolysiloxanes;
dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also consist of combinations of two or more organopolysiloxanes. Most preferably, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. When the plasticity of this component is less than about 30, as in the case of the low viscosity fluid siloxanes employed by Arkies, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the blends are weak and friable. The gums of the present invention are considerably more viscous than the silicone fluids employed in the prior art. For example, silicones contemplated by Arkles, cited supra, have an upper viscosity limit of 100,000 cS (0.1 m$^2$/s) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Optional component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 m$^2$/gram. The fumed form of silica is a preferred reinforcing filler based on its high surface area, which can be up to 450 m$^2$/gram and a fumed silica having a surface area of 50 to 400 m$^2$/g, most preferably 200 to 380 m$^2$/g, is highly preferred. Preferably, the fumed silica filler is treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10 and it is used at a level of about 5 to 50 parts by weight for each 100 parts by weight of the silica filler. When component (B') is the preferred vinyl-functional or hexenyl-functional polydimethylsiloxane, this treating agent is preferably a hydroxy-terminated polydimethylsiloxane.

When component (B") is used in the present invention, 5 to 200 parts by weight, preferably 5 to 150 and most preferably 20 to 100 parts by weight, of the reinforcing filler (B") are uniformly blended with 100 parts by weight of gum (B') to prepare silicone base (B). This blending is typically carried out at room temperature using a two-roll mill, internal mixer or other suitable device, as well known in the silicone rubber art. Alternatively, the silicone base can be formed in-situ during mixing prior to dynamic vulcanization of the gum, as further described infra. In the latter case, the temperature of mixing is kept below the softening point or melting point of the polyamide resin until the reinforcing filler is well dispersed in the diorganopolysiloxane gum.

Component (C) is a compatibilizer selected from glycidyl ester functional polymers or organofunctional grafted polyolefins. For purposes of this invention, at least one compatibilizer is included in the preparation of the thermoplastic elastomer.

In a first embodiment, the compatibilizer (C) is a glycidyl ester polymer. For purposes of this invention, a glycidyl ester polymer is defined as a polymer comprising repeating units derived from one or more glycidyl ester monomers. The glycidyl ester polymer can be a polymer, copolymer, or terpolymer. A glycidyl ester monomer means a glycidyl ester of an ethylenically unsaturated carboxylic acid such as, e.g., acrylic acid, methacrylic acid, itaconic acid, and includes, e.g., glycidyl acrylate, glycidyl methacrylate, glycidyl itaconate. Representative of suitable glycidyl ester polymers useful in the present invention are the glycidyl esters described in U.S. Pat. No. 5,981,661 as glycidyl ester impact modifiers, which is hereby incorporated by reference. Preferably, the glycidyl ester polymer comprises first repeating units derived from one or more glycidyl ester monomers and second repeating units derived from one or more alpha-olefin monomers, e.g., ethylene, propylene, 1-butene, 1-pentene. Preferably, the glycidyl ester monomer is glycidyl acrylate or glycidyl methacrylate.

Suitable glycidyl ester polymers may, optionally, contain a minor amount, i.e., up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and (C$_1$–C$_{20}$) alkyl (meth)acrylates such as, e.g., butyl acrylate, methyl methacrylate, cyclohexyl methacrylate. As used herein, the term "(C$_1$–C$_{20}$) alkyl" means a straight or branched alkyl group of from 1 to 20 carbon atoms per group, such as e.g., methyl, ethyl, decyl, eicosyl, cyclohexyl and the term "(meth)acrylate" refers collectively to acrylate compounds and methacrylate compounds.

Suitable glycidyl ester copolymers can be made by, e.g., conventional free radical initiated copolymerization.

More preferably, the glycidyl ester polymers useful as compatibilizers in the present invention are selected from olefin-glycidyl (meth)acrylate polymers, olefin-vinyl acetate-glycidyl (meth)acrylate polymers and olefin-glycidyl (meth)acrylate-alkyl (meth)acrylate polymers. Most preferably, the glycidyl ester polymer is selected from random ethylene/acrylic ester/glycidyl methacrylates copolymers or terepolymers, such as the Lotader GMA products marketed by Elf Atochem (Elf Atochem, North America, Inc., Philadelphia, Pa.) as Lotader (R) AX 8900 Resin, Lotader (R) AX 8930, and Lotader (R) AX 8840.

In a second embodiment, the copolymer compatibilizer is selected from a organofunctional grafted polyolefin. For purposes of this invention, an "organofunctional grafted polyolefin" is a homopolymer, copolymer or terepolymer of an olefin and an organofunctional grafting monomer. Representative examples of suitable olefins include: ethylene, propylene, butylene, and the like; mixtures of olefins, for example ethylene, propylene and dienes, i.e. so called EPDM. The olefin can also be selected from C$_5$–C$_{20}$ hydrocarbon alpha-olefins, vinyl acetate, alkyl acrylate or alkyl methacrylates, where the alkyl groups can be methyl, ethyl, propyl, butyl, and the like. Suitable examples of the hydrocarbon alpha-olefins include; 1-hexene, 1-octene, and 1-decene. Examples of the alkyl groups of the alkyl acrylates include methyl, ethyl, propyl and butyl. The organofunctional grafting monomer can be selected from ethylenically unsaturated hydrocarbons containing the following organofunctional groups; carboxylic acids, carboxylic acid salts, amides, imides, esters, anhydrides, epoxy, alkoxy, and oxazoline. The oxazoline group has the structure

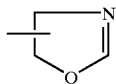

wherein the ring may contain one or more substituents selected from hydrocarbon groups having 1 to 4 carbon atoms.

Examples of ethylenically unsaturated hydrocarbons containing carboxylic acids and anhydrides, are acrylic acid, methacrylic acid, maleic acid, fumaric acid, itaconic acid, crotonic acid, itaconic anhydride, maleic anhydride, and substituted maleic anhydride, e.g. dimethyl maleic anhydride or citraconic anhydride, nadic anhydride, nadic methyl anhydride, and tetrahydrophthalic anhydride, maleic anhydride being particularly preferred. Examples of the derivatives of the unsaturated acids are salts, amides, imides and esters e.g. mono- and disodium maleate, acrylamide, maleimide, glycidyl methacrylate and dimethyl fumarate. Examples of epoxy functional monomers include allyl glycidyl ether, 1,2-epoxy-7-octene, 1,2-epoxy-9-decene, 1,2-epoxy-5-hexene. An example of a oxazoline functional monomers is vinyloxazoline. The preferred grafting monomer for use in the organofunctional grafted polyolefin compatibilizer is selected from maleic anhydride and maleic anhydride derivatives.

Preferably the organofunctional grafted polyolefin compatibilzer is selected from poly(ethylene-co-vinyl acetate)-graft- maleic anhydride, polypropylene-graft-maleic anhydride, polyethylene-polypropylene-grafted-maleic anhydride, maleic anhydride grafted EPDM rubber, maleic anhydride grafted SEBS (styrene-ethylene/butene-styrene triblock copolymer).

Most preferably the organofunctional grafted polyolefin is maleic anhydride grafted EPDM, for example commercially available as Royaltuf® 485-B (Uniroyal Chemical Company, Inc., Middlebury, Conn. 06749), or maleic anhydride grafted polypropylene, available commercially as Polybond® from the same company The content of these unsaturated grafting monomers can be from 0.1 to 10 weight percent in the grafted polymer, preferably, from 0.3 to 4 percent.

The amounts of compatibilizer (C) that can be added to step (I) of the present invention preferably ranges from 0.1 to 25 weight percent of the total of all components, more preferably, 1 to 15%, and most preferably ranges from 2 to 8% of the total of all components added.

Component (D) is exemplified by the following:

low molecular siloxanes, such as $PhSi(OSiMe_2H)_3$;

trimethylsiloxy-endblocked methylhydridopolysiloxanes;

trimethylsiloxy-endblocked dimethylsiloxane-methylhydridosiloxane copolymers;

dimethylhydridosiloxy-endblocked dimethylpolysiloxanes;

dimethylhydrogensiloxy-endblocked methylhydrogenpolysiloxanes;

dimethylhydridosiloxy-endblocked dimethylsiloxane-methylhydridosiloxane copolymers;

cyclic methylhydrogenpolysiloxanes;

cyclic dimethylsiloxane-methylhydridosiloxane copolymers;

tetrakis(dimethylhydrogensiloxy)silane;

silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units, wherein Me and Ph hereinafter denote methyl and phenyl groups, respectively.

Particularly preferred organohydrido silicon compounds are polymers or copolymers comprising RHSiO units ended with either $R_3SiO_{1/2}$ or $HR_2SiO_{1/2}$, wherein R is independently selected from alkyl groups having 1 to 20 carbon atoms, phenyl or trifluoropropyl, preferably methyl. It is also preferred that the viscosity of component (D) is about 0.5 to 1,000 mPa-s at 25° C., preferably 2 to 500 mPa-s. Further, this component preferably has 0.5 to 1.7 weight percent hydrogen bonded to silicon. It is highly preferred that component (D) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. It is understood that such a highly preferred system will have terminal groups selected from trimethylsiloxy or dimethylhdridosiloxy groups.

Component (D) may also be a combination of two or more of the above described systems. The organohydrido silicon compound (D) is used at a level such that the molar ratio of SiH therein to Si-alkenyl in component (B') is greater than 1 and preferably below about 50, more preferably 3 to 30, most preferably 4 to 20.

These SiH-functional materials are well known in the art and many of them are commercially available.

Hydrosilation catalyst (E) is a catalyst that accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al. Most preferably, catalyst (E) is a neutralized complex of platinous chloride and divinyltetramethyldisiloxane.

Component (E) is added to the present composition in a catalytic quantity sufficient to promote the reaction of components (B') and (D) and thereby cure the diorganopolysiloxane to form an elastomer. The catalyst is preferably added so as to provide about 0.1 to 500 parts per million (ppm) of metal atoms based on the total weight of the thermoplastic elastomer composition, more preferably 0.25 to 100 ppm.

In preferred embodiments of the present invention, a stabilizer (F) is included in the formulation. Stabilizer (F) is at least one organic compound selected from hindered phenols; thioesters; hindered amines; 2,2'-(1,4-phenylene) bis(4H-3, 1-benzoxazin-4-one); or 3,5-di-tert-butyl-4-hydroxybenzoic acid, hexadecyl ester.

For the purposes of the present invention, a hindered phenol is an organic compound having at least one group of the formula

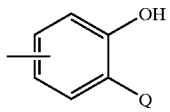

(i)

in its molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof; alkoxy groups having 1 to 24 carbon atoms, such as methoxy or t-butoxy; and hydrocarbon groups having 2 to 24 carbon atoms which contain heteroatoms (e.g., —CH$_2$—S—R", —CH$_2$—O—R" or —CH$_2$—C(O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Preferably, the hindered phenol compound has a number average molecular weight of less than about 3,000.

A preferred hindered phenol compound contains at least one group of the

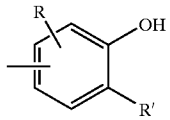

(ii)

in its molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Preferably, one to four of the groups shown in structures (i) or (ii) are attached to an organic residue of appropriate valence such that the contemplated compound has a molecular weight (MW) of less than about 1,500. Most preferably, four such groups are present in component (C) and this compound has a molecular weight of less than about 1,200. This monovalent (or polyvalent) organic residue can contain one or more heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl. For the purposes of the present invention, a group according to formula (ii) can also be attached to hydrogen to form a diorganophenol.

Non-limiting specific examples of suitable hindered phenols include 1,1,3-Tris(2'-methyl-4'-hydroxy-5'-t-butylphenyl)butane, N,N'-hexamethylene bis(3-(3,5-di-t-butyl-4-hydroxyphenyl)propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis(3,5-di-tert-butyl-4-hydroxyhydrocinnamamide), tetrakis(methylene(3,5-di-tert-butyl-4-hydroxy-hydrocinnamate))methane, 1,3,5-trimethyl-2,4,6-tris (3,5-di-tert-butyl-4-hydroxybenzyl) benzene, 4,4'-methylenebis (2,6-di-tertiary-butylphenol), 2,2'-thiobis(6-tert-butyl-4-methylphenol), 2,2'-thiobis(4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy) phenol, 2,4-bisoctylmercapto-6-(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2-octylmercapto-4,6-bis(3 ,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2, 4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate, 1,3,5-tris(4-tert-butyl-3-hydroxy-2,6-dimethylbenzyl)isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4-hydroxyphenyl) adipate, esters of beta-(3,5-di-tert-butyl-4-hydroxyphenyl)propionic acid with mono- or polyhydric alcohols (e.g., methanol, ethanol, n-octanol, trimethylhexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylolpropane, tris(hydroxyethyl) isocyanurate, N,N'-bis(hydroxyethyl)oxalamide, 3-thiaundecanol, 3-thiapentadecanol, 4-hydroxymethyl-1-phospha-2,6,7-trioxabicyclo(2.2.2) octane and esters of beta-(5-tert-butyl-4-hydroxy-3-methylphenyl)propionic acid with mono- or polyhydric alcohols (as above).

Thioesters of the invention are compounds having at least one group of the formula

 (iii)

wherein G is —CH$_2$—CH$_2$—C(O)OR''' and R''' is a monovalent hydrocarbon group having 1 to 24 carbon atoms. Specific non-limiting examples of suitable thioesters include distearyl 3,3'-thiodipropionate, dilauryl-3,3'-thiodipropionate and di(tridecyl)3,3'-thiodipropionate.

The hindered amine of the present invention is a low molecular weight organic compound or a polymer which contains at least one divalent group of the formula

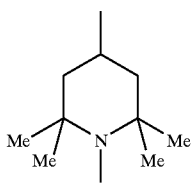

(iv)

wherein Me hereinafter denotes a methyl group. The backbone of this component is not critical as long as it does not contain functionality which would interfere with the dynamic vulcanization of the silicone gum and it may be illustrated by low-molecular and polymeric polyalkylpiperidines, as disclosed in U.S. Pat. No. 4,692,486, hereby incorporated by reference. Preferably, the above group has the structure

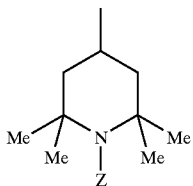

(v)

wherein Z is selected from hydrogen or an alkyl group having 1 to 24 carbon atoms, preferably hydrogen.

Specific non-limiting examples of suitable hindered amines include:

1,6-hexanediamine, N, N'-bis(2,2,6,6-pentamethyl-4-piperidinyl)-, polymers with morpholine-2,4,6-trichloro-1,3,5-triazine; 1,3-benzendicarboxamide, N, N'-bis(2,2,6,6-tetramethyl-4-piperidinyl), polymers with 2,4,-Dichloro-6-(4-morpholinyl)-1,3,5-triazine; bis(1,2,2,6,6-pentamethyl-4-piperidinyl) sebacate; bis(2,2,6,6-tetramethyl-4-piperidinyl) sebacate; dimethyl succinate polymer with 4-hydroxy-2,2,6,6-tetramethyl-1-piperidine ethanol; and polymethyl (propyl-3-oxy-(2',2',6',6'-tetramethyl-4'-piperidinyl) siloxane.

Preferred stabilizers of the invention are tetrakis(methylene(3,5-di-tert-butyl-4-hydroxy-hydrocinnamate))methane, N,N'-hexamethylenebis(3,5-di-tert-butyl-4-hydroxyhydrocinnamamide) and 1,1,3-tris(2'-methyl-4'-hydroxy-5'-t-butylphenyl)butane, 1,3,5-tris(4-tert-butyl-3-hydroxy-2,6-dimethyl benzyl)-1,3,5-triazine-2,4,6-(1H,3H, 5H trione, and dilauryl-3,3'-thiodipropionate.

Non-limiting specific examples of component (F) include various hindered phenols marketed by Ciba Specialty Chemicals Corporation under the trade name Irganox™:

Irganox™ 1076=octadecyl 3,5-di-tert-butyl-4-hydroxyhydrocinnamate,

Irganox™ 1035=thiodiethylene bis(3,5-di-tert-butyl-4-hydroxyhydrocinnamate),

Irganox™ MD1024=1,2-bis(3,5-di-tert-butyl-4-hydroxyhydrocinnamoyl)hydrazine,

Irganox™ 1330=1,3,5-trimethyl-2,4,6-tris(3,5-di-tert-butyl-4-hydroxybenzyl)benzene, Irganox™ 1425 WL=calcium bis(monoethyl(3,5-di-tert-butyl-4-hydroxybenzyl)phosphonate) and Irganox™ 3114=1,3,5-tris-(3,5-di-tert-butyl-4-hydroxybenzyl)-1,3,5-triazine-2,4,6(1H,3H,5H)-trione.

Preferred hindered phenols are Irganox™ 245 {triethyleneglycol bis (3-(3'-tert-butyl-4'-hydroxy-5'-methylphenyl) propionate)}, Irganox™ 1098 {N,N'-hexamethylenebis(3,5-di-tert-butyl-4-hydroxyhydrocinnamamide)} and Irganox™ 1010 {tetrakis(methylene(3,5-di-tert-butyl-4-hydroxyhydrocinnamate))methane}.

From 0.01 to 5 parts by weight of stabilizer (F) are preferably employed for each 100 parts by weight of polyamide (A) plus silicone base (B). Preferably 0.1 to 0.75 parts by weight, more preferably 0.4 to 0.6 parts by weight, of (F) are added for each 100 parts by weight of (A) plus (B).

In addition to the above-mentioned components, a minor amount of an optional additive (G) can be incorporated in the compositions of the present invention. Preferably, this optional component is added at a level of 0.5 to 40 weight percent based on the total composition, more preferably 0.5 to 20 weight percent. This optional additive can be illustrated by, but not limited to, reinforcing fillers for polyamide resins, such as glass fibers and carbon fibers; extending fillers, such as quartz, barium sulfate, calcium carbonate, and diatomaceous earth; pigments, such as iron oxide and titanium oxide; electrically conducting fillers, such as carbon black and finely divided metals; heat stabilizers, such as hydrated cerric oxide; antioxidants; flame retardants, such as halogenated hydrocarbons, alumina trihydrate, magnesium hydroxide and organophosphorous compounds; and other fire retardant (FR) materials. A preferred FR additive is calcium silicate particulate, preferably a wollastonite having an average particle size of 2 to 30 $\mu$m. Further, optional component (G) can be a plasticizers for the silicone gum component, such as polydimethylsiloxane oil, and/or a plasticizer for the polyamide component. Examples of the latter include phthalate esters such as dicyclohexyl phthalate, dimethyl phthalate, dioctyl phthalate, butyl benzyl phthalate and benzyl phthalate; trimellitate esters such as $C_1$–$C_9$ alkyl trimellitate; sulfonamides such as N-cyclohexyl-p-toluenesulfonamide, N-ethyl-o,p-toluenesulfonamide and o-toluenesulfonamide, and liquid oligomeric plasticizers. Preferred plasticizers are liquids of low volatility which minimize emissions of plasticizer at the common melt temperatures of polyamides.

The above additives are typically added to the final thermoplastic composition after dynamic cure, but they may also be added at any point in the preparation provided they do not interfere with the dynamic vulcanization mechanism. Of course, the above additional ingredients are only used at levels which do not significantly detract from the desired properties of the final composition.

The second step in the method of the present invention is dynamically vulcanizing the diorganopolysiloxane (B'). As used herein, "dynamically vulcanizing" means the diorganopolysiloxanes (B') undergoes a curing process, i.e, is cured. Therefore, according to the method of the present invention, the thermoplastic elastomer is prepared by thoroughly dispersing silicone base (B) and compatibilizer (C) in polyamide (A) and dynamically vulcanizing the diorganopolysiloxane in the base using organohydrido silicon compound (D) and catalyst (E). For the purposes of the present invention, the weight ratio of silicone base (B) to polyamide resin (A) is greater than 35:65. It has been found that when this ratio is 35:65 or less, the resulting vulcanizate generally has a modulus more resembling the polyamide resin than a thermoplastic elastomer. On the other hand, the above mentioned ratio should be no more than about 85:15 since the compositions tend to be weak and resemble cured silicone elastomers above this value. Notwithstanding this upper limit, the maximum ratio of (B) to (A) for any given combination of components is also limited by processability considerations since too high a silicone base content results in at least a partially crosslinked continuous phase which is no longer thermoplastic. For the purposes of the present invention, this practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Such a preferred thermoplastic elastomer which is subsequently re-processed often has a tensile strength and elongation which are within 10% of the corresponding values for the original TPSiV (i.e., the thermoplastic elastomer is little changed by re-processing). Although the amount of silicone base consistent with the above mentioned requirements depends upon the particular polyamide resin and other components selected, it is preferred that the weight ratio of components (B) to (A) is 40:60 to 75:25, more preferably 40:60 to 70:30.

Mixing is carried out in any device which is capable of uniformly dispersing the components in the polyamide resin, such as an internal mixer or a twin-screw extruder, the latter being preferred for commercial preparations. The temperature is preferably kept as low as practical consistent with good mixing so as not to degrade the resin. Depending upon the particular system, order of mixing is generally not critical and, for example, components (A), (C), (D) and, optionally, (F) can be added to (B) at a temperature above the softening point (i.e., melt point or glass temperature) of (A), catalyst (E) then being introduced to initiate dynamic vulcanization. However, components (B) through (F) should be well dispersed in resin (A) before dynamic vulcanization begins. As previously mentioned, it is also contemplated that the silicone base can be formed in-situ. For example, the reinforcing filler may be added to a mixer already containing the polyamide resin and diorganopolysiloxane gum at a temperature below the softening point of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere (i.e., one that does not adversely react with the components or otherwise interfere with the hydrosilation cure), such as dry nitrogen, helium or argon.

As noted above, in order to be within the scope of the present invention, the tensile strength or elongation, or both, of the TPSiV elastomer must be at least 25% greater than that of a corresponding simple blend. A further requirement of the invention is that the TPSiV has at least 25% elongation, as determined by the test described infra. In this context, the term "simple blend" (or physical blend) denotes a composition wherein the weight proportions of resin (A), base (B) and compatibilizer (C) are identical to the proportions in the TPSiV, but no cure agents are employed (i.e., either component (D) or (E), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. At least three such samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such TPSiVs are not within the scope of the present invention.

The thermoplastic elastomer prepared by the above described method can then be processed by conventional techniques, such as extrusion, vacuum forming, injection molding, blow molding, overmolding or compression molding. Moreover, these compositions can be re-processed (recycled) with little or no degradation of mechanical properties.

The novel thermoplastic elastomers of the present invention can be used to fabricate wire and cable insulation; vibration and sound dampening components; electrical connectors; automotive and appliance components, such as belts, hoses, air ducts, boots, bellows, gaskets and fuel line components; furniture components; "soft-feel" grips for hand-held devices (e.g., handles for tools); architectural seals; bottle closures;

medical devices; sporting goods; and general rubber parts.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 23° C., unless indicated to the contrary.

Materials

The following materials, listed alphabetically for ease of reference, were employed in the examples.

BASE 1 is a silicone rubber base made from 68.7% PDMS 1, defined infra, 25.8% of a fumed silica having a surface area of about 250 m2/g (Cab-O-Sil® MS-75 by Cabot Corp., Tuscola, Ill.), 5.4% of a hydroxy-terminated diorganopolysiloxane having an average degree of polymerization (DP) of about 8 and 0.02% of ammonium carbonate.

CATALYST 1 is a 1.5 % platinum complex of 1,3-diethenyl-1,1,3,3-tetramethyldisiloxane; 6 % tetramethyldivinyldisiloxane; 92 % dimethylvinyl ended polydimethylsiloxane and 0.5 % dimethylcyclopolysiloxanes having 6 or greater dimethylsiloxane units.

X-LINKER 1 is an SiH-functional crosslinker consisting essentially of 68.4 % MeHSiO units, 28.1 % Me2SiO units and 3.5 % Me3SiO1/2 units and has a viscosity of approximately 29 mPa·s. This corresponds to the average formula MD16D'39M, in which where M is (CH3)3Si—O—, D is —Si(CH3)2—O— and D' is —Si(H)(CH3)—O—.

COMPATIBILIZER 1 is AX 8900 is an ethylene-methyl acrylate-glycidyl methacrylate terpolymer (E-MA-GMA) marketed under the trade name AX 8900 from Elf Atochem North America, Inc., 2000 Market Street, Philadelphia, Pa. 19103.

COMPATIBILIZER 2 is AX 8930 is an ethylene-methyl acrylate-glycidyl methacrylate terpolymer (E-MA-GMA) marketed under the trade name AX 8930 from Elf Atochem North America, Inc., 2000 Market Street, Philadelphia, Pa. 19103.

COMPATIBILIZER 3 is Lotader 3410 is an ethylene-n butyl acrylate-maleic anhydride terpolymer marketed under the trade name Lotader 3410 from Elf Atochem North America, Inc., 2000 Market Street, Philadelphia, Pa. 19103.

COMPATIBILIZER 4 is Lotader 3300 is an ethylene-ethyl acrylate-maleic anhydride terpolymer marketed under the trade name Lotader 3300 from Elf Atochem North America, Inc., 2000 Market Street, Philadelphia, Pa. 19103.

COMPATIBILIZER 5 is Lotader 6200 is an ethylene-n butyl acrylate-maleic anhydride terpolymer marketed under the trade name Lotader 6200 from Elf Atochem North America, Inc., 2000 Market Street, Philadelphia, Pa. 19103.

COMPATIBILIZER 6 is Royaltuf 485-B is maleic anhydride grafted EPDM from Uniroyal Chemical Company, Inc., Middlebury, Conn. 06749.

COMPATIBILIZER 7 is maleic anhydride grafted polypropylene from Aldrich with maleic anhydride content of 0.6% and melt flow index of 115.

IRGANOX™ 1010 is a hindered phenol stabilizer marketed by Ciba-Geigy and described as tetrakis {methylene(3,5-di-tert-butyl-4-hydroxy-hydrocinnamate)} methane.

Lowinox CA22 is a hindered phenol stabilizer marketed by Great Lake Chemical Corporation and described as 1,1,3-Tris(2'-methyl-4'-hydroxy-5'-t-butylphenyl)butane NYLON 12 is Rilsan™ AMNO, a nylon 12 marketed by Elf Atochem NA, Inc., Philadelphia, Pa.; m.p.=175° C.

NYLON 6 is a nylon 6 marketed under the trade name Zytel™ 7301 by Du Pont; m.p. 215–225° C.

PDMS 1 is a gum consisting of 99.81 wt % $Me_2SiO$ units, 0.16 % MeViSiO units and 0.03% $Me_2ViSiO_{1/2}$ units. Prepared by potassium catalyzed equilibration of cyclic siloxanes wherein the catalyst is neutralized with carbon dioxide. This gum has plasticity of about 150.

Equipment:

The TPSiVs were prepared on a Polylab Haake Mixer. The mixer was fitted with a 3000 series bowl and roller rotors. The bowl was operated at 240° C. for Nylon 6 and 220° C. for Nylon 12. The rotor speed was constant at 60 RPM. During operation, a nitrogen blanket was placed on the bowl with a flow of 0.5 SCFM.

The crude TPSiV was compression molded into test plaques using a Wabash Hot Press fitted with West 4100 series temperature controllers. The press was operated at 250° C. for the Nylon 6 and 225° C. for Nylon 12. Samples were molded at 15 ton pressure for 3 minutes. Test samples were cut from the plaques following ASTM D412 specifications. At least 5 specimens were tested and the average results were reported.

Example 1

The following general procedure was used to prepare the Nylon-6 TPSiVs, summarized in Table 1.

In a typical run the bowl was heated to operating temperature (240° C.) or was already at operating temperature. The run was initialized and the bowl was charged with 120.0 g of BASE 1. The BASE 1 was mixed for 1 minute before adding 80.0 g of NYLON 6. The blend was mixed for 2 minutes before adding 3.21 g of COMPATIBILIZER 1. (concentration of compatibilizer was based on the weight of Nylon in the system.) The COMPATIBILIZER 1 was mixed for 2 minutes and then 1.08 g of Lowinox CA-22 stabilizer was added. After 2 minutes mixing, 3.86 g of X-LINKER 1 was added. The crosslinker was mixed for 4 minutes to ensure good dispersion. Then, 2.28 g of dilute CATALYST 1 was added. After addition of the catalyst, the torque started increasing as indication of the cure reaction of the silicone base. The run was terminated and the TPSiV was removed from the bowl 2 minutes after the torque leveled off.

TABLE 1

Compatibilization of PA6 TPSiVs

| Run Number | Compatibilizer Number | Compatibilizer Concentration (wt % to nylon) | Max Torque m.g | Tensile Strength Mpa | Elongation at break % |
|---|---|---|---|---|---|
| 1 | None | Control | 4000 | 15.7 | 132.6 |
| 2 | 1 | 1 | 4500 | 14.8 | 130.2 |
| 3 | " | 2 | 4900 | 17.4 | 206 |
| 4 | " | 4 | 5500 | 17.38 | 210.5 |
| 5 | 2 | 1 | 4100 | 16.3 | 147.1 |
| 6 | " | 2 | 4700 | 17.8 | 195.4 |
| 7 | " | 4 | 4800 | 17.2 | 180.8 |
| 8 | 3 | 1 | 5300 | 17.1 | 150.6 |
| 9 | " | 2 | 5700 | 15.1 | 108.1 |
| 10 | " | 4 | 6100 | 16.9 | 126.1 |
| 11 | 4 | 1 | 5200 | 17.1 | 155.6 |
| 12 | " | 2 | 5800 | 18.9 | 173.4 |
| 13 | " | 4 | 6100 | 18.4 | 146.3 |
| 14 | 5 | 1 | 5000 | 16.2 | 145.4 |
| 15 | " | 2 | 5200 | 17.3 | 148.8 |
| 16 | " | 4 | 5400 | 17.7 | 163.1 |
| 17 | 6 | 1 | 4000 | 17.0 | 140.4 |
| 18 | " | 2 | 4300 | 19.1 | 163.6 |
| 19 | 6 | 4 | 5000 | 17.6 | 142.9 |

Example 2

The following general procedure was used to prepare the Nylon-12 TPSiVs, summarized in Table 2.

In a typical run, the bowl was heated to operating temperature (220° C.) or was already at operating temperature. The run was initialized and the bowl was charged with 120.0 g of BASE 1. The BASE 1 was mixed for 1 minute before adding 80.0 g of NYLON 12 and the desired amount of compatibilizer. The compatibilized NYLON-12/BASE 1 (concentration of compatibilizer is based on the weight of Nylon in the system.) Then 1.0 g of Irganox 1010 stabilizer was added. After 2 minutes mixing 1.95 g of X-LINKER 1 was added. The crosslinker was mixed for 4 minutes to ensure good dispersion before the run was catalyzed with 2.25g of CATALYST 1. After addition of the catalyst, the torque started increasing as indication of the cure reaction of the silicone base. The run was terminated and the TPSiV was removed from the bowl 2 minutes after the torque leveled off.

TABLE 2

Compatibilization of PA 12 TPSiVs

| Run Number | Compatibilizer Number | Compatibilizer Concentration (wt % to nylon) | Max Torque m.g | Tensile Strength Mpa | Elongation at break % |
|---|---|---|---|---|---|
| 20 | None | Control | 4000 | 9.6 | 83.4 |
| 21 | 1 | 1 | 4500 | 14.3 | 208.7 |
| 22 | " | 2 | 5000 | 15.3 | 251.2 |
| 23 | " | 4 | 6200 | 15.7 | 259.2 |
| 24 | 7 | 2 | 5500 | 12.6 | 157.2 |

That which is claimed is:

1. A method for preparing a thermoplastic elastomer, said method comprising:
   (I) mixing
      (A) a Theologically stable polyamide resin having a melting point or glass transition temperature of 25° C. to 275° C.,
      (B) a silicone base comprising
         (B') 100 parts by weight of a diorganopolysiloxane gum having a plasticity of at least 30 and having an average of at least 2 alkenyl groups in its molecule and optionally,
(B") 5 to 200 parts by weight of a reinforcing filler, the weight ratio of said silicone base to said polyamide resin is from 35:65 to 85:15,
(C) a compatibilizer selected from glycidyl ester polymers or organofunctional grafted polyolefins,
(D) an organohydrido silicon compound which contains an average of at least 2 silicon-bonded hydrogen groups in its molecule and
(E) a hydrosilation catalyst, components (D) and (E) being present in an amount sufficient to cure said diorganopolysiloxane (B'); and
(II) dynamically vulcanizing said diorganopolysiloxane (B').

2. The method according to claim 1, wherein the weight ratio of said silicone base (B) to said polyamide resin (A) is from 35:65 to 75:25.

3. The method according to claim 2, wherein said polyamide is selected from the group consisting of nylon 6, nylon 6/6, nylon 6/12 and nylon 12.

4. The method according to claim 2, wherein said diorganopolysiloxane (B') is a gum selected from the group consisting of a copolymer consisting essentially of dimethylsiloxane units and methylvinylsiloxane units and a copolymer consisting essentially of dimethylsiloxane units and methylhexenylsiloxane units and said reinforcing filler (B") is a fumed silica.

5. The method according to claim 1 wherein the compatibilizer is a glycidyl ester polymer comprising repeating units of one or more glycidyl ester monomers.

6. The method according to claim 5 wherein the glycidyl ester polymer comprises first repeating units derived from one or more glycidyl ester monomers and second repeating units derived from one or more alpha-olefin monomers.

7. The method according to claim 6, wherein the glycidyl ester monomer is glycidyl acrylate or glycidyl methacrylates.

8. The method according to claim 5, wherein the glycidyl ester polymer is selected from olefin-glycidyl (meth)acrylate polymers, olefin-vinyl acetate-glycidyl (meth)acrylate polymers and olefin-glycidyl (meth)acrylate-alkyl (meth) acrylate polymers.

9. The method according to claim 5, wherein the glycidyl ester polymer is a random ethylene/acrylic ester/glycidyl methacrylates copolymer or terpolymer.

10. The method according to claim 1, wherein compatibilizer is a organofunctional grafted polyolefin comprising a homopolymer, copolymer or terpolymer of an olefin and an organofunctional grafting monomer.

11. The method according to claim 10, wherein the organofunctional grafting monomer is an ethylenically unsaturated hydrocarbon comprising an organofunctional group selected from carboxylic acids, carboxylic acid salts, amides, imides, esters, anhydrides, epoxy, alkoxy, and oxazoline.

12. The method according to claim 10 where the organofunctional grafted polyolefin is selected from poly(ethylene-co-viny acetate)-graft-maleic anhydride, polypropylene-graft-maleic anhydride, polyethylene-polypropylene-grafted-maleic anhydride, maleic anhydride grafted EPDM rubber, maleic anhydride grafted SEBS (styrene-ethylene/butene-styrene triblock copolymer).

13. The method according to claim 12 where the organofunctional grafted polyolefin is maleic anhydride grafted EPDM.

14. The method according to claim 1, wherein said organohydrido silicon component (D) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon and having a viscosity of 2 to 500 mPa-s at 25° C. and said catalyst (E) is a neutralized complex of platinous chloride and divinyltetramethyldisiloxane.

15. The method according to claims 1 wherein 0.01 to 5 parts by weight of a stabilizer (F) per 100 parts by weight of said polyamide plus said silicone base is included in mixing step (I), said stabilizer being selected from hindered phenols; thioesters; hindered amines; 2,2'-(1,4-phenylene)bis(4H-3,1-benzoxazin-4-one); and 3,5-di-tert-butyl-4-hydroxybenzoic acid, hexadecyl ester.

16. A thermoplastic elastomer prepared by the method of claim 1.

17. A thermoplastic elastomer prepared by the method of claim 2.

18. A thermoplastic elastomer prepared by the method of claim 3.

19. A thermoplastic elastomer prepared by the method of claim 4.

20. A thermoplastic elastomer prepared by the method of claim 5.

21. A thermoplastic elastomer prepared by the method of claim 6.

22. A thermoplastic elastomer prepared by the method of claim 7.

23. A thermoplastic elastomer prepared by the method of claim 8.

24. A thermoplastic elastomer prepared by the method of claim 9.

25. A thermoplastic elastomer prepared by the method of claim 10.

26. A thermoplastic elastomer prepared by the method of claim 11.

27. A thermoplastic elastomer prepared by the method of claim 12.

28. A thermoplastic elastomer prepared by the method of claim 13.

29. A thermoplastic elastomer prepared by the method of claim 14.

30. A thermoplastic elastomer prepared by the method of claim 15.

* * * * *